United States Patent
Mu

(10) Patent No.: US 12,224,863 B2
(45) Date of Patent: Feb. 11, 2025

(54) COMMUNICATION PROCESSING METHOD INCLUDING DROPPING OF REPETITION TRANSMISSION IN SEARCH SPACE AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 133 days.

(21) Appl. No.: 18/009,712

(22) PCT Filed: Jun. 11, 2020

(86) PCT No.: PCT/CN2020/095671
§ 371 (c)(1),
(2) Date: Dec. 9, 2022

(87) PCT Pub. No.: WO2021/248417
PCT Pub. Date: Dec. 16, 2021

(65) Prior Publication Data
US 2023/0327808 A1   Oct. 12, 2023

(51) Int. Cl.
*H04L 1/08* (2006.01)
*H04L 1/00* (2006.01)
*H04L 5/00* (2006.01)

(52) U.S. Cl.
CPC . *H04L 1/08* (2013.01); *H04L 5/00* (2013.01)

(58) Field of Classification Search
CPC . H04B 17/3912; H04L 1/0038; H04L 5/0051; H04L 5/0091; H04L 25/0202;
(Continued)

(56) References Cited

U.S. PATENT DOCUMENTS 11,838,933 B2 * 12/2023 Takeda .............. H04W 72/0446
2023/0039484 A1 * 2/2023 Wu .................... H04W 72/0446
(Continued)

FOREIGN PATENT DOCUMENTS

CN   104081710 A   10/2014
CN   109302718 A   2/2019
(Continued)

OTHER PUBLICATIONS

Notice of Allowance issued to Chinese Application No. 202080001256.8 dated Mar. 29, 2023, (4p).
(Continued)

*Primary Examiner* — Justin R Knapp
(74) *Attorney, Agent, or Firm* — Arch & Lake LLP

(57) ABSTRACT

The present disclosure relates to a communication processing method and apparatus, and a storage medium. The communication processing method includes: in response to that a plurality of search spaces for repetition transmissions are configured in a same transmission time unit, performing detections in the search spaces for repetition transmissions according to a preset detection rule; and in response to that cumulative search spaces where the detections are performed exceed a physical downlink control channel detection limit, dropping a current search space where a detection is currently performed and a search space where a detection is not performed.

20 Claims, 5 Drawing Sheets

S21

In response to that a plurality of search spaces for repetition transmissions are needed in a same transmission time unit, perform repetition transmissions in the search spaces according to a preset transmission rule

S22

In response to that cumulative search spaces where repetition transmissions are performed exceed a physical downlink control channel transmission limit, drop a current search space where a repetition transmission is currently performed and a search space where a repetition transmission is not performed

(58) Field of Classification Search
CPC ....... H04L 5/0094; H04L 5/0053; H04L 1/08; H04L 5/0064; H04L 1/0045; H04L 5/001; H04L 1/0072; H04L 1/0061; H04L 1/0013; H04W 72/23; H04W 72/53
See application file for complete search history.

(56) References Cited

U.S. PATENT DOCUMENTS

| | | | |
|---|---|---|---|
| 2023/0085345 A1* | 3/2023 | Li | H04L 5/0096 370/329 |
| 2023/0120035 A1* | 4/2023 | Taherzadeh Boroujeni | H04B 17/3912 370/329 |

FOREIGN PATENT DOCUMENTS

| | | | |
|---|---|---|---|
| CN | 109644082 | A | 4/2019 |
| CN | 109891789 | A | 6/2019 |
| CN | 110149180 | A | 8/2019 |
| CN | 110166203 | A | 8/2019 |
| CN | 110351841 | A | 10/2019 |
| CN | 111093270 | A | 5/2020 |
| WO | 2019112209 | A | 6/2019 |
| WO | 2019139955 | A1 | 7/2019 |
| WO | 2020020292 | A1 | 1/2020 |
| WO | 2020064512 | A1 | 4/2020 |
| WO | 2020091558 | A1 | 5/2020 |

OTHER PUBLICATIONS

Huawei, HiSilicon, "Remaining issues for physical downlink control channel", 3GPP TSG RAN WG1 Meeting #95, R1-1812181, Spokane, WA, Nov. 12-16, 2018, (15p).
Extended European Search Report issued in Application No. 20939797.5, dated Feb. 28, 2024,(8p).
International Search Report issued in Application No. PCT/CN2020/095671, dated Mar. 10, 2021, with English translation,(6p).
LG Electronics, "PDCCH enhancements for NR URLLC", 3GPP TSG RAN WG1 Meeting #95, R1-1812572, Spokane, USA, Nov. 12-16, 2018, (5p).
Apple Inc, "Remaining Issues on PDCCH Enhancements for eURLLC", 3GPP TSG RAN WG1 #100bis, R1-2002329, e-Meeting, Apr. 20-30, 2020, (7p).
Spreadtrum Communications, "On PDCCH candidate priority rules" 3GPP TSG RAN WG1 Meeting #92bis, R1-1804214, Sanya, China, Apr. 16-20, 2018, (2p).
5 The First CNOA issued in Application No. 202080001256.8, dated Oct. 17, 2022, with English translation, (18p).

* cited by examiner

COMMUNICATION PROCESSING METHOD INCLUDING DROPPING OF REPETITION TRANSMISSION IN SEARCH SPACE AND APPARATUS, AND STORAGE MEDIUM

CROSS-REFERENCE

The present application is the U.S. National Stage of International Application No. PCT/CN2020/095671, filed on Jun. 11, 2020, the entire disclosure of which is incorporated herein by reference for all purposes.

TECHNICAL FIELD

The present disclosure generally relates to the communication technical field, and more particularly, to a communication processing method and device and a storage medium.

BACKGROUND

As Internet of Things services continue to grow, such as video surveillance, smart home, wearable devices and industrial sensing and monitoring are becoming popular. These services usually require rate of tens to 100M, and also have relatively high requirements on latency, and thus it is difficult for Machine Type Communication (MTC) and Narrow band Internet of thing (NB-IoT) technologies to such requirements. Therefore, it is proposed to design a new terminal type in 5G New Radio (NR) to meet the requirements of mid-range Internet of Things devices. In the current 3GPP standardization, this new terminal type is called Reduced capability UE or NR-lite for short.

For NR-lite, a network device needs to do coverage enhancement and the same search space will be repeatedly configured multiple times in one slot. In most cases, the repeated configurations of multiple search spaces configured by the network device do not exceed the detection limit of physical downlink control channel (PDCCH) transmissions (the number of blind detections or the number of monitored non-overlapped control channel elements (CCEs)). But, in some cases, the repeated configurations of multiple search spaces configured by the network device may result in exceeding the detection limit of the PDCCH transmissions. For example, if a user needs to monitor both the common search space and the user's specific search space in a slot, the detection limit of PDCCH transmissions may be exceeded. In case the configured repetition transmissions in multiple search spaces exceed the detection limit of PDCCH transmissions, search space dropping (PDCCH dropping) is required.

In the related art, when PDCCH dropping is performed, a search space with the largest search space index will be dropped preferentially, and when the search space with the largest index in the slot is configured with multiple repetition transmissions, all repetition transmissions in the search space with the largest index in the slot will be dropped.

SUMMARY

In order to address the problems existing in related arts, the present disclosure provides a communication processing method and device and a storage medium.

According to a first aspect of embodiments of the present disclosure, there is provided a communication processing method, applied to a terminal, the method including:

in response to that a plurality of search spaces for repetition transmissions are configured in a same transmission time unit, performing detections in the search spaces for repetition transmissions according to a preset detection rule; and in response to that cumulative search spaces where the detection is performed exceed a physical downlink control channel detection limit, dropping a current search space where the detection is currently performed and a search space where the detection is not performed.

According to a second aspect of embodiments of the present disclosure, there is provided a communication processing method, applied to a network device, the method including:

in response to that a plurality of search spaces for repetition transmissions are needed in a same transmission time unit, performing repetition transmissions in the search spaces according to a preset transmission rule; and in response to that cumulative search spaces where repetition transmissions are performed exceed a physical downlink control channel transmission limit, dropping a current search space where a repetition transmission is currently performed and a search space where a repetition transmission is not performed.

According to a third aspect of embodiments of the present disclosure, there is provided a communication processing device, applied to a terminal, the device including:

a detection unit configured to, in response to that a plurality of search spaces for repetition transmissions are configured in a same transmission time unit, perform detections on the search spaces for repetition transmissions according to a preset detection rule; and a dropping unit configured to, in response to that cumulative search spaces where the detection is performed exceed a physical downlink control channel detection limit, drop a current search space where the detection is currently performed and a search space where the detection is not performed.

According to a fourth aspect of embodiments of the present disclosure, there is provided a communication processing device, applied to a network device, the communication processing device including:

a transmission unit configured to, in response to that a plurality of search spaces for repetition transmissions are needed in a same transmission time unit, perform repetition transmissions in the search spaces according to a preset transmission rule; and a dropping unit configured to, in response to that cumulative search spaces where repetition transmissions are performed exceed a physical downlink control channel transmission limit, drop a current search space where a repetition transmission is currently performed and a search space where a repetition transmission is not performed.

According to a fifth aspect of embodiments of the present disclosure, there is provided a communication processing device, including:

a processor; and a memory storing instructions executable by the processor;

wherein the processor is configured to perform the communication processing method according to the first aspect or any implementation of the first aspect.

According to a sixth aspect of embodiments of the present disclosure, there is provided a communication processing device, including:

a processor; and a memory storing instructions executable by the processor;

wherein the processor is configured to perform the communication processing method according to the second aspect or any implementation of the second aspect.

According to a seventh aspect of embodiments of the present disclosure, there is provided a non-transitory computer readable storage medium, wherein when instructions in the storage medium are executed by a processor of a mobile terminal, the mobile terminal is caused to perform the communication processing method according to the first aspect or any implementation of the first aspect.

According to an eighth aspect of embodiments of the present disclosure, there is provided a non-transitory computer readable storage medium, wherein when instructions in the storage medium are executed by a processor of a network device, the network device is caused to perform the communication processing method according to the second aspect or any implementation or the second aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of devices and methods consistent with aspects related to the present disclosure as recited in the appended claims.

Figure 1:
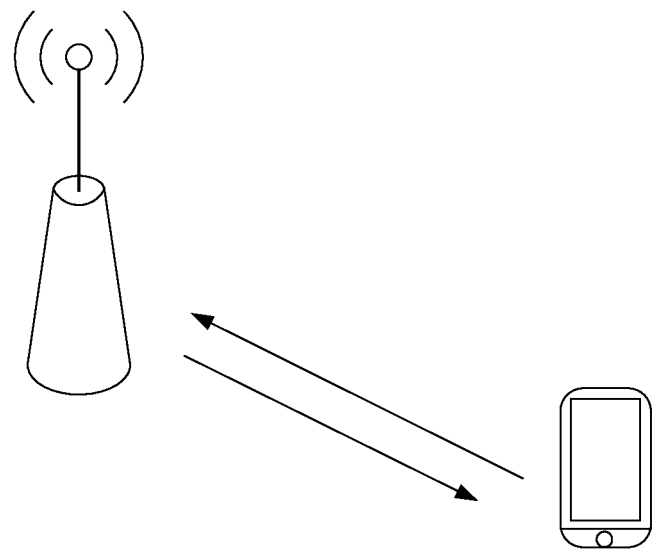
FIG. 1 is an architecture diagram of a wireless communication system according to an example embodiment.

The access method provided by embodiments of the present disclosure may be applied in a wireless communication system shown in FIG. 1. Referring to FIG. 1, a terminal and a network device are included in the wireless communication system. Information is transmitted and received between the terminal and the network device via radio resources.

It will be understood that the wireless communication system shown in FIG. 1 is only schematically illustrated, and the wireless communication system may also include other network devices, such as a core network device, a wireless relay device, and a wireless backhaul device, etc., which are not shown in FIG. 1. Embodiments of the present disclosure do not limit the number of network devices and the number of terminals included in the wireless communication system.

It is further understood that the wireless communication system of the embodiments of the present disclosure is a network that provides wireless communication functions. The wireless communication system may employ different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), or Carrier Sense Multiple Access with Collision Avoidance. Depending on the capacity, rate, and delay of different networks, the networks can be classified as a 2G (second generation) network, a 3G network, a 4G network, or a future evolved network such as a 5G network, which can also be called a New Radio (NR) network. For ease of description, the present disclosure will sometimes refer to the wireless communication network as simply network.

Further, the network device involved in the present disclosure may also be referred to as a wireless access network device. The wireless access network device may be: a base station, an evolved node B (base station), a home base station, an access point (AP) in a wireless fidelity (WiFi) system, a wireless relay node, a wireless backhaul node, a transmission point (TP), or a transmission and reception point (TRP), or a gNB in the NR system, or a component or part of devices constituting a base station, etc. The network device may also be a vehicle-mounted device when the system is a Vehicle-to-Everything (V2X) communication system. It should be understood that in the embodiments of the present disclosure, the specific technology and the specific device form used for the network device are not limited.

Further, the terminal involved in the present disclosure may also be referred to as a terminal device, User Equipment (UE), Mobile Station (MS), Mobile Terminal (MT), etc. The terminal is a device that provides voice and/or data connectivity to a user. For example, the terminal may be a handheld device with a wireless connection function, or a vehicle-mounted device, etc. Currently, some examples of the terminal are: mobile phone, Pocket Personal Computer (PPC), pocket PC, Personal Digital Assistant (PDA), laptop, tablet, a wearable device, or a vehicle-mounted device, etc. In addition, the terminal device may also be a vehicle-mounted device when the system is a Vehicle-to-Everything (V2X) communication system. It should be understood that in the embodiments of the present disclosure, the specific technology and the specific device form used for the terminal are not limited.

The terminal involved in embodiments of the present disclosure may be understood as a new terminal type designed in 5G NR: Reduced capability UE or simply NR-lite. In embodiments of the present disclosure, this new terminal is referred to as 5G NR-lite.

Similar to Internet of Things (IoT) devices in Long Term Evolution (LTE), the 5G NR-lite typically needs to meet the following requirements:

low cost, low complexity;
some degree of coverage enhancement; and
power saving.

Since the current NR system is designed for high speed and low latency high-end terminals, the current design cannot meet the above requirements for NR-lite. Therefore, the current NR system needs to be modified to meet the NR-lite requirements. For example, in order to meet the requirements of low cost and low complexity, the Radio Frequency (RF) bandwidth of NR-IoT may be limited, for example, being limited to 5M Hz or 10M Hz; or, the buffer size of NR-lite may be limited, so as to limit the size of each received transmission block, and so on. Possible optimization directions for power saving are simplifying the communication flows, reducing the number of times for the NR-lite terminal to detect the downlink control channel, and so on.

The basic constituting unit of PDCCH in NR is Resource Element Group (REG). One REG corresponds to the size of one Physical Resource Block (PRB) (12 Resource Elements (REs)) in the frequency domain, and corresponds to the size of one Orthogonal Frequency Division Multiplexing (OFDM) symbol in the time domain. Six REGs form a Control Channel Element (CCE). In the current NR system, a PDCCH may consist of 1, 2, 4, 8, or 16 CCEs. The number of CCEs contained in a PDCCH is called aggregation level. When the information bits of a PDCCH are fixed, the aggregation level is mainly determined by channel conditions. When a user's channel condition is good, a smaller aggregation level may be used. When the channel condition is poor, a larger aggregation level is chosen. In addition, the protocols or standards support multiple candidate transmission locations for a PDCCH of a particular aggregation level. For example, for a PDCCH with CCE=4, there may be two candidate transmission locations, and a network device and a terminal may calculate the CCE numbers of these two candidate locations in a configured control resource set according to a preset rule, for example, CCE #0~CCE #3 and CCE #4~CCE #7.

In the current NR, the network device may configure the aggregation level and the candidate transmission locations for the PDCCH under each aggregation level for a terminal. Since the terminal does not know in advance which aggregation level the network device will use and at which candidate transmission location the network device will transmit the PDCCH, or which DCI format the network device will transmit, the terminal needs to perform a blind detection on the PDCCH.

When the terminal performs PDCCH blind detection, it needs to satisfy the PDCCH transmission detection limit. In NR, the protocols or standards specify the maximum number of times of blind detections for a user in a slot with different subcarrier spacing parameters (corresponding to u in Table 1 below) as shown in Table 1 below:

TABLE 1

| u | maximum number of times of blind detections |
|---|---|
| 0 | 44 |
| 1 | 36 |
| 2 | 22 |
| 3 | 20 |

Also, the total number of non-overlapping CCEs monitored by the user within a slot cannot exceed the number shown in Table 2 below:

TABLE 2

| u | number of non-overlapping CCEs |
|---|---|
| 0 | 56 |
| 1 | 56 |

TABLE 2-continued

| u | number of non-overlapping CCEs |
|---|---|
| 2 | 48 |
| 3 | 32 |

The terminal may monitor multiple search spaces in one slot during communication processing, and each search space has a corresponding search space index (e.g., ID). When there are multiple search spaces in a slot, it is possible that the number of times of PDCCH blind detections of the user or the total number of monitored non-overlapping CCEs will exceed a limit. In this case, the protocols or standards allow the terminal to drop some search spaces. The criteria for dropping is that only a terminal-specific search space can be dropped, and a search space with a larger search space index will be dropped in priority among the terminal's search spaces. And, when the terminal monitors a certain search space resulting in exceeding the PDCCH detection limit, the terminal needs to drop the entire search space. The scheme in which the terminal performs detections in the search space(s) and drops a search space when the cumulative number of times of detections of transmissions in the search spaces exceeds the PDCCH detection limit is called PDCCH dropping.

In an example, assuming that the maximum number of times of blind detections in a slot is 44, the number of times of detections corresponding to search space index 1 is 20, the number of times of detections corresponding to search space index 2 is 20, and the number of times of detections corresponding to search space index 3 is 10. Therefore, during communication processing, the terminal sequentially performs detections in an ascending order of search space indexes. When the detections in the search space 3 are performed, the cumulative number of times of detections in the search spaces is 50, and thus the detections of transmissions in the search space index 3 will result in exceeding the PDCCH detection limit (exceeding the maximum number of times 44 of blind detections), and thus the terminal will drop search space index 3.

In the current NR-lite, the same search space will also be repeatedly configured in a slot several times due to the need of coverage enhancement. In most cases, the repetition transmissions of search spaces configured by network devices do not exceed the PDCCH detection limit, but in some cases the limit can be exceeded. For example, if a user in a slot needs to monitor both a common search space and a user-specific search space, the limit may be exceeded. If the previous PDCCH dropping principle continues to be reused, all repetition transmissions in a search space with a larger index in a slot will be dropped.

In an example, assuming that the maximum number of times of blind detections in a slot is 44, search space index 1 corresponds to two configured repetition transmissions and the number of times of detections for each repetition transmission is 8. Search space index 2 corresponds to two configured repetition transmissions, and the number of times of detections for each repetition transmission is 8. Search space index 3 corresponds to two configured repetition transmissions and the number of times of detections for each repetition transmission is 8. According to the conventional scheme in which sequential detections are performed in the ascending order of the search space indexes, the terminal performs sequential detections in the ascending order of the search space indexes during communication processing. When detection of the first repetition transmission in the search space 3 is performed, the cumulative number of times of detections in the search spaces is 40, which does not exceed the PDCCH detection limit (the maximum number of times 44 of blind detections). But, when detection of the second repetition transmission in the search space index 3 is performed, the cumulative number of times of detections in the search spaces is 48, which exceeds the PDCCH detection limit (the maximum number of times 44 of blind detections). The terminal will drop both the first repetition transmission and the second repetition transmission in search space index 3. However, the first repetition transmission in search space 3 has already been completed and it would have been possible not to drop the first repetition transmission.

Therefore, according to the existing PDCCH dropping, when NR-lite repeatedly configures the search spaces in a slot for repeated transmissions, if the cumulative number of times of detections in the search spaces exceeds the PDCCH detection limit, it may cause that all repetition transmissions in a monitored search space with a large search space index will be dropped, thereby resulting in decrease of communication efficiency.

In view of the above, embodiments of the present disclosure provide a communication processing method. In the communication processing method, in response to that a plurality of search spaces for repetition transmissions are configured in a same transmission time unit (e.g., a slot), a PDCCH dropping principle is optimized based on the search space indexes and/or the search spaces for repetition transmissions, making the transmissions more efficient.

Figure 2:
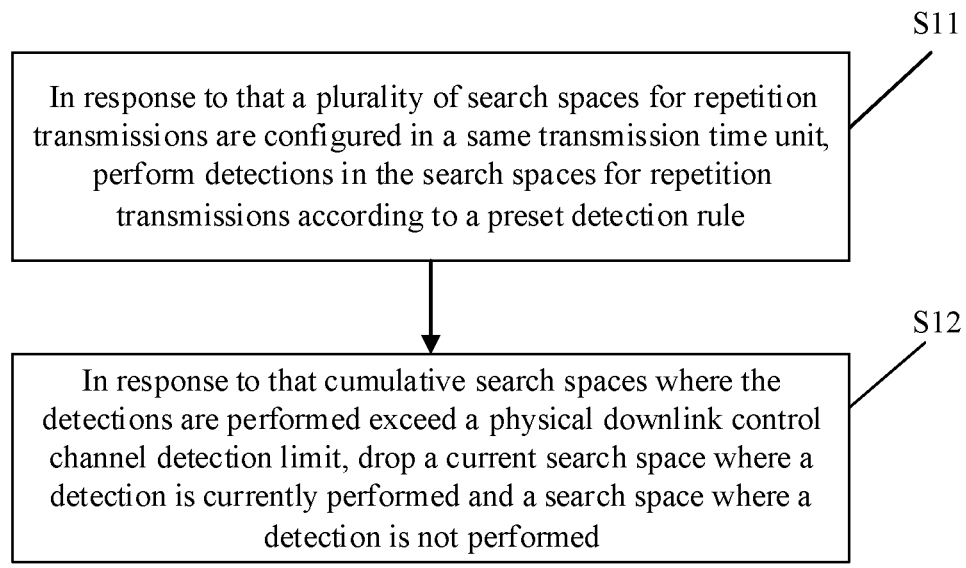
FIG. 2 is a flowchart of a communication processing method according to an example embodiment.

FIG. 2 is a flow chart of a communication processing method according to an example embodiment. As shown in FIG. 2, the communication processing method is applied in a terminal. The method includes the following steps.

In step S11, in response to that a plurality of search spaces for repetition transmissions are configured in a same transmission time unit, detections in the search spaces for repetition transmissions are performed according to a preset detection rule.

In embodiments of the present disclosure, the transmission time unit configured with search spaces for repetition transmissions may be a slot, or a subslot, or other transmission time unit. The following embodiments of the present disclosure are illustrated with the transmission time unit being a slot as an example.

In embodiments of the present disclosure, based on the search space indexes and/or the search spaces for repetition transmissions, a preset detection rule is predefined for the terminal to perform detections in the search spaces to take the search space indexes and the search spaces for repetition transmissions into account, thereby improving communication efficiency.

In step S12, in response to that cumulative search spaces where the detections are performed exceed a physical downlink control channel detection limit, a current search space where the detection is currently performed and a search space where the detection is not performed are dropped.

In embodiments of the present disclosure, there are various ways to drop the current search space where the detection is currently performed and the search space where the detection is not performed. For example, no detection is performed in the received search space. As another example, the received search space is deleted. Embodiments of the present disclosure do not impose specific limitations on this.

The PDCCH detection limit in embodiments of the present disclosure may be the maximum number of times of blind detections or the maximum number of non-overlapping CCEs.

In embodiments of the present disclosure, multiple search spaces for repetition transmissions are sequentially detected according to a preset detection rule. When the accumulated detected search spaces exceed the PDCCH detection limit, a current search space where the detection is currently performed and a search space where the detection is not performed are dropped.

Embodiments of the present disclosure are described below in relation to practical applications in which the preset detection rule is involved.

In one implementation, the preset detection rule includes: in an ascending order of search space indexes, performing a detection in a search space for repetition transmissions with a smaller search space index preferentially. Or, the preset detection rule includes: in a descending order of search space indexes, performing a detection in a search space for repetition transmissions with a larger search space index preferentially. The principles of the two detection rules are similar, and the implementations of the present disclosure will be illustrated below with the ascending order of search space indexes as an example; of course, a person skilled in the art can understand that such an illustration by example does not constitute a limitation on implementations of the present disclosure.

In embodiments of the present disclosure, determination is made sequentially according to the search space indexes. When all repetition transmissions in a search space in one slot have been verified as not exceeding the PDCCH detection limit, whether the terminal performs detection in a next search space is continued to be verified. In response to the cumulative search spaces where the detection is performed exceed the PDCCH detection limit, a current search space where the detection is currently performed and a search space where the detection is not performed are dropped. In this way, it is possible to ensure that for a search space where detection of repetition transmissions has been completed, normal transmission may be performed without being dropped, thereby improving communication efficiency. For example, in the above example, assuming that the maximum number of times of blind detections in a slot is 44, search space index 1 corresponds to two configured repetition transmissions and the number of times of detections for each repetition transmission is 8. Search space index 2 corresponds to two configured repetition transmissions, and the number of times of detections for each repetition transmission is 8. Search space index 3 corresponds to two configured repetition transmissions and the number of times of detections for each repetition transmission is 8. In the ascending order of the search space indexes, detection is performed sequentially in the search spaces for repetition transmissions. When detection is performed in the search space for the second repetition transmission in the search space 3, the cumulative number of times of detections in the search spaces is 50. The detection in the search space for the second repetition transmission in the search space index 3 results in exceeding the PDCCH detection limit (i.e., exceeding the maximum number of times 44 of blind detections). Thus, the terminal drops the search space for the second repetition transmission in the search space index 3, but does not drop the search space for the first repetition transmission in the search space index 3, thereby improving the communication efficiency.

In another implementation, the preset detection rule includes: in a temporal order of time domain transmissions, performing a detection in a search space where a time domain transmission happens earlier preferentially. Of course, this implementation can be used in combination with the aforementioned implementation where detection is performed in the order of the search space indexes. That is, with respect to search spaces for different repetition transmissions with a same search space index, in a temporal order of time domain transmissions, the detection in a search space where a time domain transmission happens earlier is prioritized. Of course, this implementation can also be used independently. Whether used alone or together with the preceding embodiments, the principle of the detection rule is similar. The implementation of the present disclosure will be illustrated below with the implementation used together with the preceding implementation as an example; of course, a person skilled in the art can understand that such an illustration does not constitute a limitation of embodiments of the present disclosure.

In the embodiments of the present disclosure, when the terminal performs detection of repetition transmissions in the search spaces sequentially in an ascending order of the search space indexes, when there are search space repetition transmissions with a same search space index, it is needed to define a dropping priority between different repetition transmissions with a same search space index. For example, the priority may be determined based on the temporal order of repetition transmissions (temporal order of time domain transmissions). For example, a search space repetition transmission, transmission of which happens later, has a lower priority, and will be dropped preferentially.

In another embodiment of the present disclosure, the preset detection rule includes: determining a dropping priority between different repetition transmissions. For example, the priority may be determined based on the temporal order of the repetition transmissions (temporal order of time domain transmissions). For example, a search space repetition transmission, transmission of which happens later, has a lower priority, and will be dropped preferentially.

In embodiments of the present disclosure, receipt and demodulation are sequentially performed in search spaces in a temporal order of time domain transmissions for the same search space index, and as long as further reception and demodulation in a particular search space lead to exceeding the PDCCH detection limit, this search space and the subsequent search spaces are dropped. In other words, when the terminal monitors that part of the repetition transmissions of a search space in the same search space index does not exceed the PDCCH detection limit, but when the terminal monitors all repetition transmissions, the PDCCH detection limit will be exceeded, the terminal will only drop a part of the repetition transmissions of this search space, but will not drop all repetition transmissions.

Figure 3:
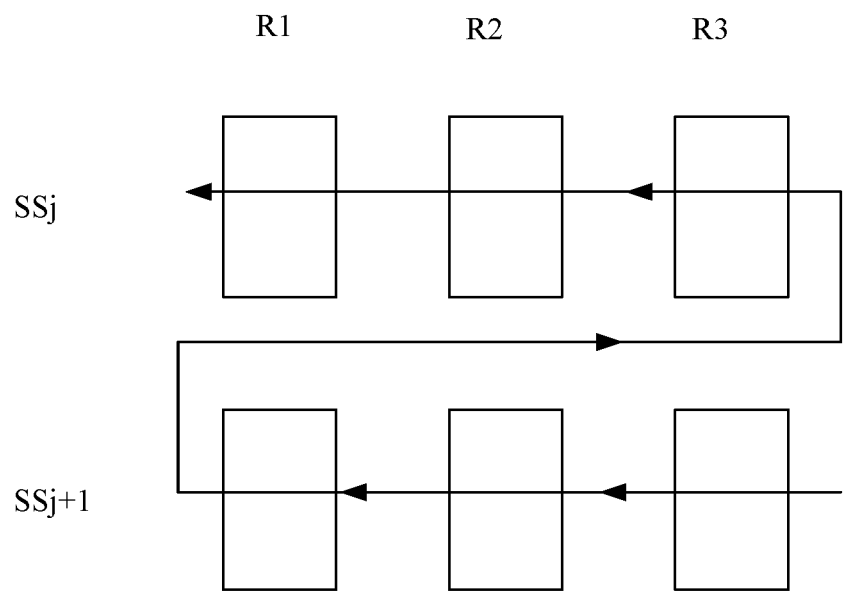
FIG. 3 is an example diagram showing search space dropping according to an example embodiment.

FIG. 3 is an example diagram showing search space dropping according to an example embodiment. Referring to FIG. 3, SSj and SSj+1 in the figure represent two search space indexes, respectively, with SSj+1 representing a larger search space index. R1, R2 and R3 in the figure are repetition transmission number identifiers of the search spaces for the first repetition transmission, the second repetition transmission and the third repetition transmission, respectively, where R3 is the largest and R1 is the smallest. For both SSj and SSj+1, three repetition transmissions are performed in each of the two search spaces. The direction of the arrows in the figure indicates the order for dropping the search spaces. For example, the third repetition transmission in SSj+1 is dropped first, followed by the second repetition transmission in SSj+1, and so on.

For example, in the above example, assuming that the maximum number of times of blind detections in the slot is 44, search space index 1 corresponds to two configured repetition transmissions and the number of times of detections for each transmission is 8. Search space index 2 corresponds to two configured repetition transmissions, and the number of times of detections for each transmission is 8. Search space index 3 corresponds to two configured repetition transmissions and the number of times of detections for each transmission is 8. In the ascending order of the search space indexes, detection is performed sequentially in the search spaces for repetition transmissions, and in each search space, in the temporal order of time domain transmissions, the detection in a search space where a time domain transmission happens earlier is prioritized. For example, detection in the search space 1 is performed first. When the detection in the search space for the first repetition transmission and the second repetition transmission of the search space 1 are completed, the detection in the search space for the first repetition transmission and the second repetition transmission of the search space index 2 is performed, and so on, until the detection in the search space for the second repetition transmission of the search space 3 is performed, the cumulative number of times of detections in the search spaces is 50. The detection in the search space for the second repetition transmission of the search space index 3 will result in exceeding the PDCCH detection limit (exceeding the maximum number of times 44 of the blind detections). Thus, the terminal will drop the search space for the second repetition transmission of the search space index 3, but will not drop the search space for the first repetition transmission of the search space index 3, thereby improving communication efficiency.

In another implementation, each of the search spaces for repetition transmissions has repetition transmission number identifiers which are based on a chronological order of the repetition transmissions and are increased in order. The preset detection rule includes: in an ascending order of repetition transmission number identifiers, performing a detection in a search space for a repetition transmission with a smaller repetition transmission number identifier preferentially. Or, the preset detection rule includes: in a descending order of repetition transmission number identifiers, performing a detection in a search space for a repetition transmission with a larger repetition transmission number identifier preferentially. The principles of the two detection rules are similar, and the implementation of the present disclosure is illustrated below with the ascending order of repetition transmission number identifiers as an example; of course, it is understood by those skilled in the art that such an illustration by way of example is not a limitation of the implementation of the present disclosure. Of course, this implementation can be used in conjunction with the aforementioned implementation which is based on the order of search space indexes; this implementation can also be used independently. Whether used alone or in conjunction with the aforementioned embodiments, the principles of the detection rules are similar. The implementation of the present disclosure will be illustrated below with the implementation used together with the preceding implementation as an example; of course, a person skilled in the art can understand that such an illustration does not constitute a limitation of embodiments of the present disclosure.

In embodiments of the present disclosure, the repetition transmission number identifiers may be repetition transmission numbers. For example, the repetition transmission number identifier of the search space for the first repetition transmission in the search space index 1 may be 1, and the repetition transmission number identifier of the search space for the second repetition transmission in the search space index 1 may be 2. The repetition transmission number identifier of the search space for the first repetition transmission in the search space index 2 may be 1, and repetition transmission number identifier of the search space for the second repetition transmission in the search space index 2 may be 2. Prioritizing a detection in a search space for a repetition transmission with a smaller repetition transmission number identifier in an ascending order of the repetition transmission number identifiers may be understood as: performing detection first in the search space for the first repetition transmission (the search space with the repetition transmission number identifier 1), and then performing detection in the search space for the second repetition transmission (the search space with the repetition transmission number identifier 2), and so on, until the cumulative detections in the search spaces exceed the PDCCH detection limit, and dropping a current search space where the detection is currently performed and a search space where the detection is not performed.

In another implementation, in addition to performing a detection in a search space for a repetition transmission with a smaller repetition transmission number identifier preferentially in an ascending order of repetition transmission number identifiers, the preset detection rule further includes: with respect to search spaces with a same repetition transmission number identifier and corresponding to different search space indexes, in an ascending order of the search space indexes, performing a detection in a search space with a smaller search space index preferentially.

Figure 4:
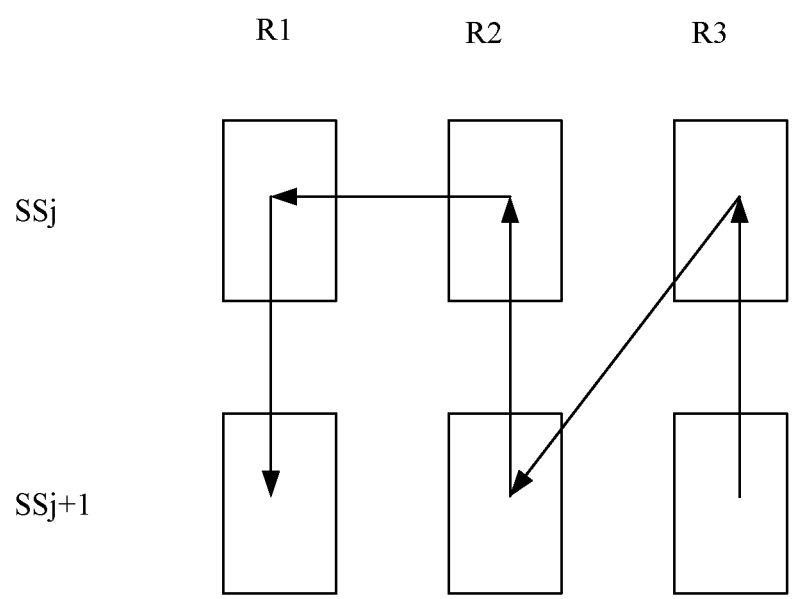
FIG. 4 is an example diagram showing search space dropping according to an example embodiment.

FIG. 4 is an example diagram showing search space dropping according to an example embodiment. Referring to FIG. 4, SSj and SSj+1 in the figure represent two search space indexes of two search spaces, respectively, with SSj+1 representing a larger search space index. Three repetition transmissions are performed in each of the two search spaces. R1, R2 and R3 in the figure are repetition transmission number identifiers of the search spaces for the first repetition transmission, the second repetition transmission and the third repetition transmission, respectively, where R3 is the largest and R1 is the smallest. In an ascending order of repetition transmission number identifiers, the detection in a search space for a repetition transmission with a smaller repetition transmission number identifier is performed preferentially, and with respect to search spaces with a same repetition transmission number identifier and corresponding to different search space indexes, the detection in a search space with a smaller search space index is performed preferentially in an ascending order of the search space indexes. Detection in the search spaces with the repetition transmission number identifier R1 is performed first, and in the search spaces with the repetition transmission number identifier R1, detection in SSj is performed first, and then detection in SSj+1 is performed. After the detection in the search spaces with the repetition transmission number identifier R1 is completed, the detection in the search spaces with the repetition transmission number identifier R2 is performed. In the search spaces with the repetition transmission number identifier R2, detection in SSj is performed first, and then detection in SSj+1 is performed, and so on, until cumulative detections in the search spaces exceed the PDCCH detection limit, and under such condition, the terminal drops a current search space where the detection is currently performed and a search space where the detection is not performed. In embodiments of the present disclosure, when performing search space dropping, the order for dropping the search spaces is opposite to the order for performing detection in the search spaces. For example, the direction of the arrows in FIG. 4 represents the order for dropping the search spaces. For example, the search space with the repetition transmission number identifier R3 and the search space index SSj+1 is dropped first, and then the search space with the repetition transmission number identifier R3 and the search space index SSj is dropped, and so on.

In yet another embodiment of the present disclosure, the preset detection rule includes: in a temporal order of time domain transmissions, performing a detection in a search space where a time domain transmission happens earlier performed preferentially.

In one example, assuming that the maximum number of times of blind detections in a slot is 44, transmissions in search space 1, search space 2, . . . , search space N are performed sequentially in a temporal order of time domain transmissions. Each of the search space 1, search space 2, . . . , search space N corresponds to the number of times of detections of 8. In the temporal order of time domain transmissions, the detection in a search space where a time domain transmission happens earlier is performed preferentially. The detection in search space 1 is performed first, then the detection in search space 2 is performed, and so on, until the cumulative detections in the search spaces exceed the PDCCH detection limit, and under such condition, a current search space where the detection is currently performed and a search space where the detection is not performed are dropped. In the example, when detection is performed in search space 5, the cumulative number of times of detections in the search spaces is 40, which does not exceed the PDCCH detection limit (the maximum number of times 44 of blind detections). When detection is performed in search space 6, the cumulative number of times of detections in the search spaces is 48, which exceeds the PDCCH detection limit (the maximum number of times 44 of blind detections). Under such condition, the search space 6 and subsequent search spaces where detection is not performed are dropped.

In embodiments of the present disclosure, after the terminal drops the search space(s), it can stop monitoring the dropped search space on the one hand; or continue to monitor a search space where a network device provides supplemental repetition transmissions until the number of times of repetition transmissions of the search space meets a configured number of times of repetition transmissions.

Figure 5:
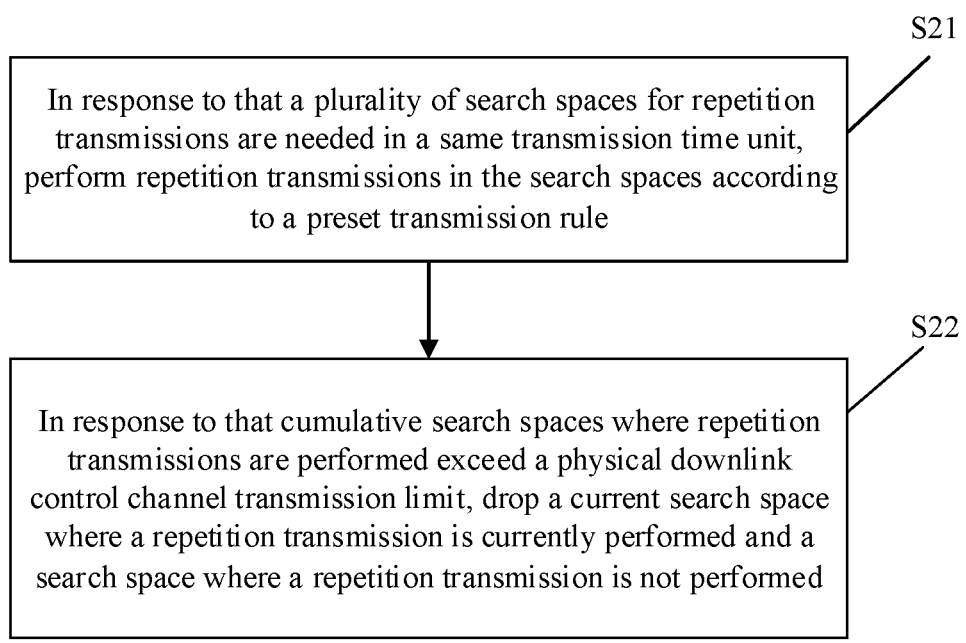
FIG. 5 is a flow chart of a communication processing method according to an example embodiment.

FIG. 5 is a flow chart of a communication processing method according to an example embodiment. As shown in FIG. 5, the communication processing method is applied in a network device. The method includes the following steps.

In step S21, in response to that a plurality of search spaces for repetition transmissions are needed in a same transmission time unit, repetition transmissions in the search spaces are performed according to a preset transmission rule.

The preset transmission rule is determined based on search space indexes and/or search spaces for the repetition transmissions.

In embodiments of the present disclosure, the transmission time unit configured with search spaces for repetition transmissions may be a slot, or a subslot, or other transmission time unit. The following embodiments of the present disclosure are illustrated with the transmission time unit being a slot as an example.

In embodiments of the present disclosure, based on the search space indexes and/or the search spaces for repetition transmissions, a preset transmission rule is predefined for the network device to perform transmissions in the search spaces. The network device performs repetition transmissions in the search spaces according to the preset transmission rule, to take the search space indexes and the search spaces for repetition transmissions into account, thereby improving communication efficiency.

In step S22, in response to that cumulative search spaces where repetition transmissions are performed exceed a physical downlink control channel transmission limit, a current search space where a repetition transmission is currently performed and a search space where a repetition transmission is not performed are dropped.

In embodiments of the present disclosure, there are various ways to drop the current search space where the repetition transmission is currently performed and the search space where the repetition transmission is not performed. For example, no repetition transmission is performed in a search space where repetition transmission is being performed. As another example, a search space where repetition transmission is not performed is deleted. Embodiments of the present disclosure do not impose specific limitations on this.

Embodiments of the present disclosure are described below in relation to practical applications in which the preset detection rule is involved.

In one implementation, the preset transmission rule includes: in an ascending order of search space indexes, performing repetition transmission(s) in a search space with a smaller search space index preferentially. Or, the preset transmission rule includes: performing the repetition transmission(s) in a search space with a larger search space index preferentially in a descending order of search space indexes. The principles of the two detection rules are similar, and the implementations of the present disclosure will be illustrated below with the ascending order of search space indexes as an example; of course, a person skilled in the art can understand that such an illustration by example does not constitute a limitation on implementations of the present disclosure.

In embodiments of the present disclosure, determination is made according to the search space indexes. When all repetition transmissions in a search space in one slot have been verified not to exceed the PDCCH detection limit, whether the terminal performs detection in a next search space is continued to be verified. In response to the cumulative search spaces where the repetition transmission(s) is(are) performed exceeds the PDCCH detection limit, a current search space where the repetition transmission is currently performed and a search space where the repetition transmission is not performed are dropped. In this way, it is possible to ensure that for a search space where repetition transmissions has been completed, normal transmission may be performed without being dropped, thereby improving communication efficiency.

In another implementation, the preset transmission rule includes: in a temporal order of time domain transmissions, performing the repetition transmission in a search space where a time domain transmission happens earlier preferentially. Of course, this implementation can be used in combination with the aforementioned implementation where repetition transmission is performed in the order of the search space indexes. That is, with respect to search spaces for different repetition transmissions with a same search space index, in a temporal order of time domain transmissions, the repetition transmission in a search space where a time domain transmission happens earlier is prioritized. Of course, this implementation can also be used independently. Whether used alone or together with the preceding embodiments, the principle of the transmission rule is similar. The implementation of the present disclosure will be illustrated below with the implementation used together with the preceding implementation as an example; of course, a person skilled in the art can understand that such an illustration does not constitute a limitation of embodiments of the present disclosure.

In the embodiments of the present disclosure, when the network device performs repetition transmissions in the search spaces sequentially according to an ascending order of the search space indexes, when there are search spaces for different repetition transmissions with a same search space index, it is needed to define a dropping priority between search spaces for different repetition transmissions with a same search space index. For example, the priority may be determined based on the temporal order of repetition transmissions (temporal order of time domain transmissions). For example, a search space repetition transmission, transmission of which happens later, has a lower priority, and will be dropped first.

In another embodiment of the present disclosure, the preset detection rule includes: determining a dropping priority between different repetition transmissions. For example, the priority may be determined based on the temporal order of the repetition transmissions (temporal order of time domain transmissions). For example, a search space repetition transmission, transmission of which happens later, has a lower priority, and will be dropped first.

In embodiments of the present disclosure, repetition transmissions are sequentially performed in search spaces in a temporal order of time domain transmissions for the same search space index, and as long as further repetition transmission in a particular search space leads to exceeding the PDCCH detection limit, the repetition transmission in this search space and the subsequent search spaces are dropped. In other words, when the terminal monitors that part of the repetition transmissions of a search space in the same search space index does not exceed the PDCCH detection limit, but when the terminal monitors all repetition transmissions, the PDCCH detection limit will be exceeded, the terminal will only drop a part of the repetition transmissions of this search space, but will not drop all repetition transmissions.

In another implementation, each of the search spaces for repetition transmissions has repetition transmission number identifiers which are based on a chronological order of the repetition transmissions and are increased in order. The preset transmission rule includes: in an ascending order of repetition transmission number identifiers, performing the repetition transmission in a search space with a smaller repetition transmission number identifier preferentially. Or, the preset transmission rule includes: in a descending order of repetition transmission number identifiers, performing the repetition transmission in a search space for a repetition transmission with a larger repetition transmission number identifier preferentially. The principles of the two transmission rules are similar, and the implementation of the present disclosure is illustrated below with the ascending order of repetition transmission number identifiers as an example; of course, it is understood by those skilled in the art that such an illustration by way of example is not a limitation of the implementation of the present disclosure. Of course, this implementation can be used in conjunction with the aforementioned implementation which is based on the order of search space indexes; this implementation can also be used independently. Whether used alone or in conjunction with the aforementioned embodiments, the principles of the transmission rules are similar. The implementation of the present disclosure will be illustrated below with the implementation used together with the preceding implementation as an example; of course, a person skilled in the art can understand that such an illustration does not constitute a limitation of embodiments of the present disclosure.

In embodiments of the present disclosure, the repetition transmission number identifiers may be repetition transmission numbers. performing the repetition transmission in a search space for a repetition transmission with a smaller repetition transmission number identifier preferentially in an ascending order of the repetition transmission number identifiers may be understood as: performing repetition transmission first in the search space for the first repetition transmission (the search space with the repetition transmission number identifier 1), and then performing repetition transmission in the search space for the second repetition transmission (the search space with the repetition transmission number identifier 2), and so on, until the cumulative repetition transmissions in the search spaces exceed the PDCCH detection limit, and dropping a current search space where the repetition transmission is currently performed and a search space where the repetition transmission is not performed.

In another implementation, the preset transmission rule includes: in an ascending order of repetition transmission number identifiers, performing the repetition transmission in a search space with a smaller repetition transmission number identifier preferentially, and with respect to search spaces with a same repetition transmission number identifier and corresponding to different search space indexes, in an ascending order of the search space indexes, performing the repetition transmission in a search space with a smaller search space index preferentially.

In yet another embodiment of the present disclosure, the preset transmission rule includes: in a temporal order of time domain transmissions, performing the repetition transmission in a search space where a time domain transmission happens earlier preferentially.

In embodiments of the present disclosure, the PDCCH transmission limit includes the maximum number of times of blind detections of the physical downlink control channel or the maximum number of non-overlapped CCEs.

In embodiments of the present disclosure, after the network device drops the search space(s) for repetition transmissions, it can choose to not provide supplemental repetition transmissions in a dropped search space; or to provide supplemental repetition transmissions in the dropped search space until a number of times of repetition transmissions of the search space meets a configured number of times of repetition transmissions.

It is understood that in embodiments of the present disclosure, the process of setting the preset transmission rule for the network device to drop the search space(s) in the process of performing repetition transmissions in the search space(s) is similar to the preset detection rule for the network device to perform detection and drop the search space(s), and embodiments of the present disclosure will not provide details here. Details can be found in description about the process of setting the preset detection rule at the terminal side.

It is further understood that the communication processing methods provided by the embodiments of the present disclosure can also be applied to the process where the network device and the terminal interact with each other to achieve search space dropping, and the specific implementations can be found in description about the process of search space dropping at the terminal side or the network side, and details are not repeated here.

Based on the same idea, an embodiment of the present disclosure further provides a communication processing device.

It should be understood that, in order to achieve the aforementioned functions, the communication device provided by embodiments of the present disclosure contains hardware structures and/or software modules corresponding to the respective functions. In combination with the units and algorithmic steps of each example disclosed in the embodiments of the present disclosure, the embodiments of the present disclosure can be implemented in the form of hardware or a combination of hardware and computer software. Whether a particular function is implemented in hardware or computer software driving hardware depends on the particular application and design constraints of the technical solutions. A person skilled in the art may use a different approach for each particular application to implement the described functions, and such implementation should not be considered as outside the scope of the technical solutions of the embodiments of the present disclosure.

Figure 6:
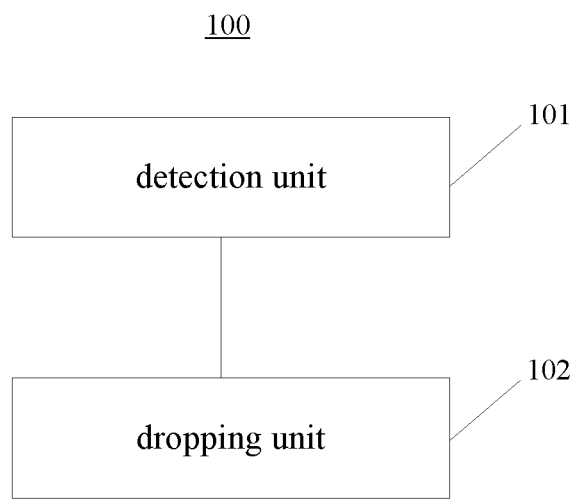
FIG. 6 is a block diagram of a communication processing device according to an example embodiment.

FIG. 6 is a block diagram of a communication processing device according to an example embodiment. Referring to FIG. 6, the communication device 100 includes a detection unit 101 and a dropping unit 102. The communication processing device 100 may be applied in a terminal. The detection unit 101 is configured to, in response to that a plurality of search spaces for repetition transmissions are configured in a same transmission time unit, perform detections in the search spaces for repetition transmissions according to a preset detection rule. The dropping unit 102 is configured to, in response to that cumulative search spaces where the detection is performed exceed a PDCCH detection limit, drop a current search space where the detection is currently performed and a search space where the detection is not performed.

In an implementation, the preset detection rule includes: in an ascending order of search space indexes, performing the detection in a search space for repetition transmissions with a smaller search space index preferentially.

In another implementation, the preset detection rule further includes: with respect to search spaces for different repetition transmissions with a same search space index, in a temporal order of time domain transmissions, performing the detection in a search space where a time domain transmission happens earlier preferentially.

In another implementation, each of the search spaces for repetition transmissions has repetition transmission number identifiers which are based on a chronological order of the repetition transmissions and are increased in order. The preset detection rule includes: in an ascending order of repetition transmission number identifiers, performing the detection in a search space for a repetition transmission with a smaller repetition transmission number identifier preferentially.

In another implementation, the preset detection rule further includes: with respect to search spaces with a same repetition transmission number identifier and corresponding to different search space indexes, in an ascending order of the search space indexes, performing the detection in a search space with a smaller search space index preferentially.

In another implementation, the preset detection rule includes: in a temporal order of time domain transmissions, performing the detection in a search space where a time domain transmission happens earlier preferentially.

In another implementation, the PDCCH detection limit includes a maximum number of times of blind detections of the PDCCH or a maximum number of non-overlapped control channel elements.

In another implementation, the detection unit 101 is further configured to:

stop monitoring of the dropped search space; or continue to monitor a search space where a network device provides supplemental repetition transmissions until a number of times of repetition transmissions of the search space meets a configured number of times of repetition transmissions.

Figure 7:
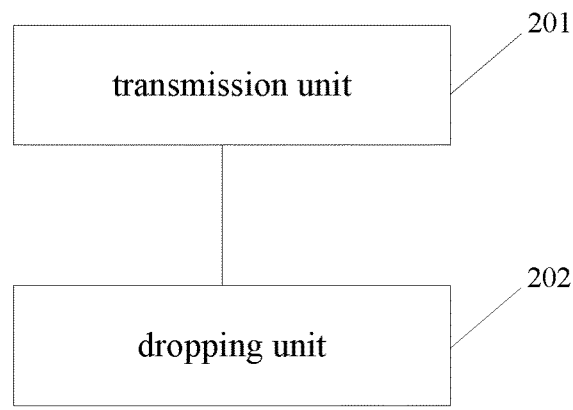
FIG. 7 is a block diagram of a communication processing device according to an example embodiment.

FIG. 7 is a block diagram of a communication processing device according to an example embodiment. Referring to FIG. 7, the communication processing device 200 includes a transmission unit 201 and a dropping unit 202. The communication processing device 200 may be applied to a network device. The transmission unit 201 is configured to, in response to that a plurality of search spaces for repetition transmissions are needed in a same transmission time unit, perform repetition transmissions in the search spaces according to a preset transmission rule. The dropping unit 202 is configured to, in response to that cumulative search spaces where repetition transmissions are performed exceed a physical downlink control channel transmission limit, drop a current search space where a repetition transmission is currently performed and a search space where a repetition transmission is not performed.

In an implementation, the preset transmission rule includes: in an ascending order of search space indexes, performing the repetition transmissions in a search space with a smaller search space index preferentially.

In another implementation, the preset transmission rule further includes: with respect to search spaces for different repetition transmissions with a same search space index, in a temporal order of time domain transmissions, performing the repetition transmission in a search space where a time domain transmission happens earlier preferentially.

In another implementation, each of the search spaces for repetition transmissions has repetition transmission number identifiers which are based on a chronological order of the repetition transmissions and are increased in order. The preset transmission rule includes: in an ascending order of repetition transmission number identifiers, performing the repetition transmission in a search space with a smaller repetition transmission number identifier preferentially.

In another implementation, the preset transmission rule further includes: with respect to search spaces with a same repetition transmission number identifier and corresponding to different search space indexes, in an ascending order of the search space indexes, performing the repetition transmission in a search space with a smaller search space index preferentially.

In another implementation, the preset transmission rule includes: in a temporal order of time domain transmissions, performing the repetition transmission in a search space where a time domain transmission happens earlier preferentially.

In another implementation, the PDCCH transmission limit includes a maximum number of times of blind detections of the PDCCH or a maximum number of non-overlapped control channel elements.

In another implementation, the transmission unit 201 is further configured to: not provide supplemental repetition transmissions in a dropped search space. Or, the transmission unit 201 is further configured to provide supplemental repetition transmissions in the dropped search space until a number of times of repetition transmissions of the search space meets a configured number of times of repetition transmissions.

Regarding the devices in the above embodiments, the specific way in which each module performs its operation has been described in detail in the embodiments of the methods, and detailed descriptions will be omitted here.

Figure 8:
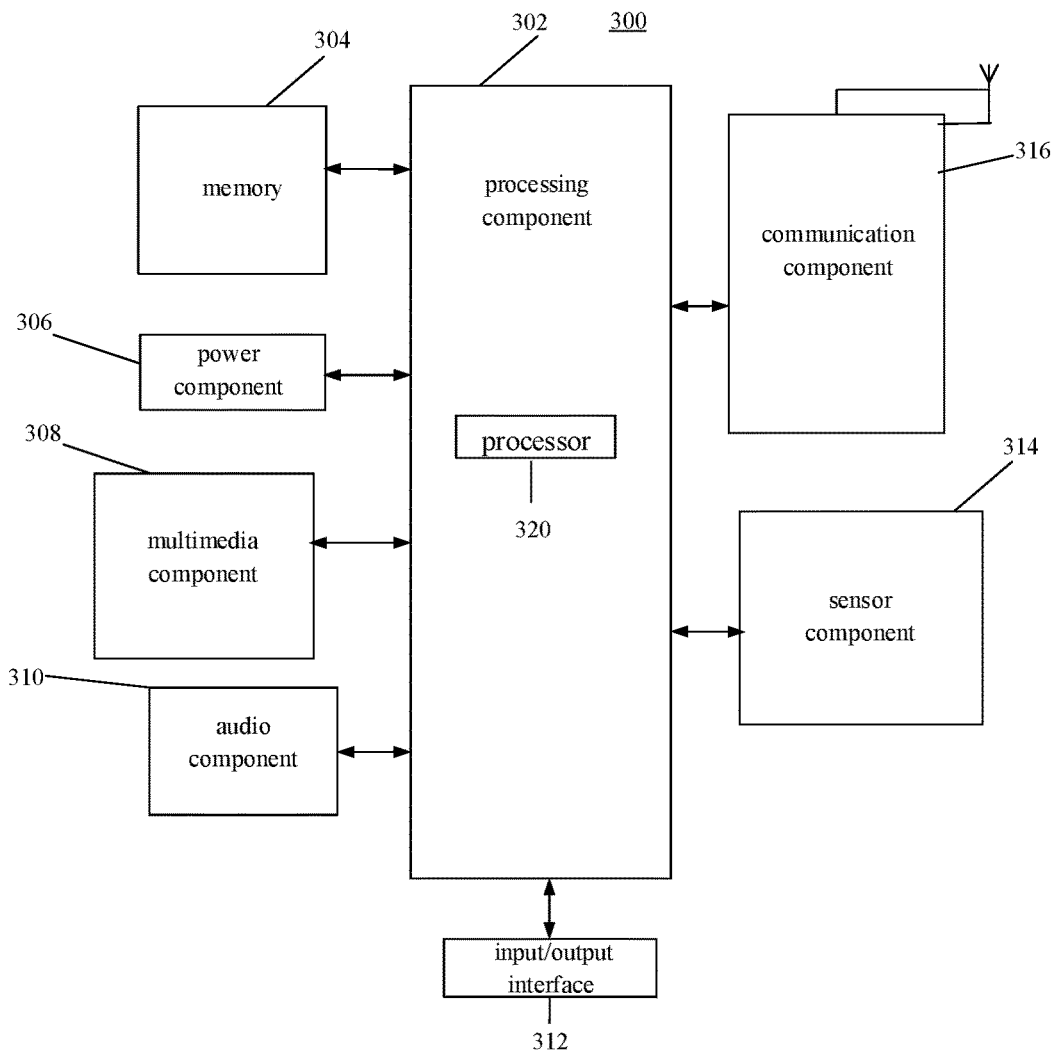
FIG. 8 is a block diagram of a device according to an example embodiment.

FIG. 8 is a block diagram of a device 300 for communication processing according to an example embodiment. For example, the device 300 may be a mobile phone, a computer, a digital broadcast terminal, a messaging device, a gaming console, a tablet, a medical device, exercise equipment, a personal digital assistant, and the like.

Referring to FIG. 8, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one example embodiment, the communication component 316 receives a broadcast signal or broadcast associated information from an external broadcast management system via a broadcast channel. In one example embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 9:
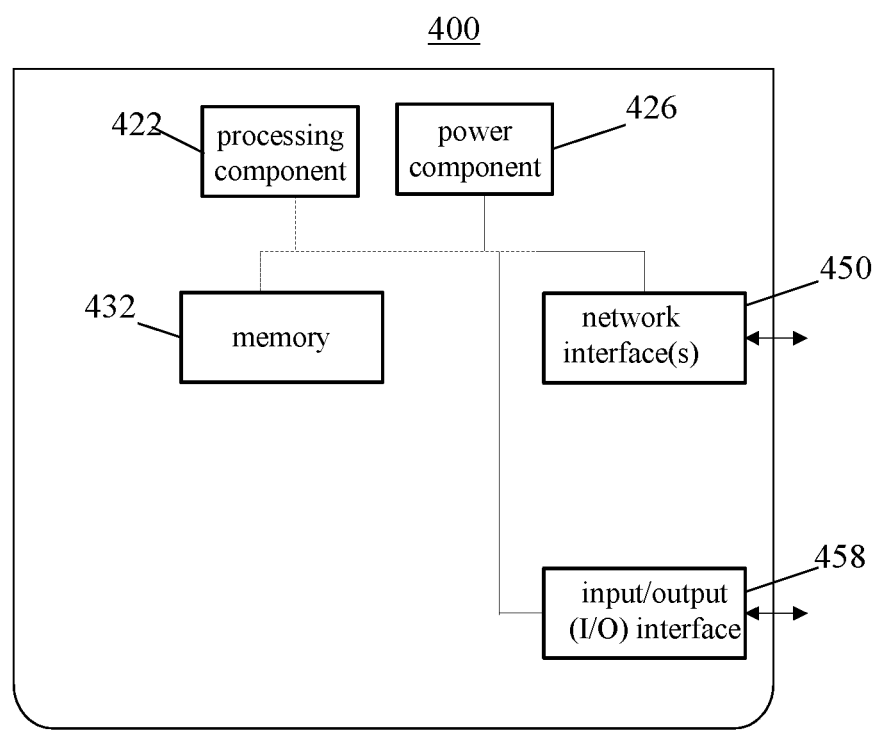
FIG. 9 is a block diagram of a device according to an example embodiment.

FIG. 9 is a block diagram of a device 400 for communication processing according to an example embodiment. For example, the device 400 may be provided as a network device, such as a base station. Referring to FIG. 9, the device 400 includes a processing component 422 that further includes one or more processors, and memory resources represented by a memory 432 for storing instructions executable by the processing component 422, such as application programs. The application programs stored in the memory 432 may include one or more modules each corresponding to a set of instructions. Further, the processing component 422 is configured to execute the instructions to perform the above described method.

The device 400 may also include a power component 426 configured to perform power management of the device 400, wired or wireless network interface(s) 450 configured to connect the device 400 to a network, and an input/output (I/O) interface 458. The device 400 may operate based on an operating system stored in the memory 432, such as Windows Server', Mac OS X™, Unix™, Linux™, FreeBSD™, or the like.

In an example embodiment, there is provided a non-transitory computer-readable storage medium having stored therein instructions, e.g., the memory 432 including instructions. The instructions may be executed by the processing component 422 of the device 400 to perform the above methods. For example, the non-transitory computer-readable storage medium may be ROM, Random Access Memory (RAM), CD-ROM, a magnetic tape, a floppy disk, or an optical data storage device and so on.

It is understood that the term "plurality" in the present disclosure refers to two or more, and other quantifiers are similar. The word "and/or" describes a relationship of associated objects, indicating that there can be three relationships, for example, A and/or B means: A alone, B alone, and A and B together. The character "/" generally indicates that the associated objects before and after "/" is in an "or" relationship. The singular forms "a/an", "said" and "the" are also intended to include plural forms, unless the context clearly indicates otherwise.

It is further understood that the terms "first", "second", etc. are used to describe a variety of information, but the variety of information should not be limited to these terms. These terms are used only to distinguish information of the same type from one another and do not indicate a particular order or level of importance. In fact, the expressions "first" and "second" can be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

According to a first aspect of embodiments of the present disclosure, there is provided a communication processing method, applied to a terminal, the method including:
    in response to that a plurality of search spaces for repetition transmissions are configured in a same transmission time unit, performing detections in the search spaces for repetition transmissions according to a preset detection rule; and in response to that cumulative search spaces where the detection is performed exceed a physical downlink control channel detection limit, dropping a current search space where the detection is currently performed and a search space where the detection is not performed.

In an implementation, the preset detection rule includes: in ascending order of search space indexes, performing a detection in a search space for repetition transmissions with a smaller search space index preferentially.

In another implementation, the preset detection rule further includes: with respect to search spaces for different repetition transmissions with a same search space index, in a temporal order of time domain transmissions, performing a detection in a search space where a time domain transmission happens earlier preferentially.

In another implementation, each of the search spaces for repetition transmissions has repetition transmission number identifiers which are based on a chronological order of the repetition transmissions and are increased in order; the preset detection rule includes: in an ascending order of repetition transmission number identifiers, performing a detection in a search space for a repetition transmission with a smaller repetition transmission number identifier preferentially.

In another implementation, the preset detection rule further includes: with respect to search spaces with a same repetition transmission number identifier and corresponding to different search space indexes, in an ascending order of the search space indexes, performing a detection in a search space with a smaller search space index preferentially.

In another implementation, the preset detection rule includes: in a temporal order of time domain transmissions, performing a detection in a search space where a time domain transmission happens earlier preferentially.

In another implementation, the physical downlink control channel detection limit includes a maximum number of times of blind detections of the physical downlink control channel or a maximum number of non-overlapped control channel elements.

In another implementation, the method further includes: stopping monitoring of the dropped search space; or
continuing to monitor a search space where a network device provides supplemental repetition transmissions until a number of times of repetition transmissions of the search space meets a configured number of times of repetition transmissions.

According to a second aspect of embodiments of the present disclosure, there is provided a communication processing method, applied to a network device, the method including:
in response to that a plurality of search spaces for repetition transmissions are needed in a same transmission time unit, performing repetition transmissions in the search spaces according to a preset transmission rule; and in response to that cumulative search spaces where repetition transmissions are performed exceed a physical downlink control channel transmission limit, dropping a current search space where a repetition transmission is currently performed and a search space where a repetition transmission is not performed.

In an implementation, the preset transmission rule includes: in an ascending order of search space indexes, performing repetition transmissions in a search space with a smaller search space index preferentially.

In another implementation, the preset transmission rule further includes: with respect to search spaces for different repetition transmissions with a same search space index, in a temporal order of time domain transmissions, performing a repetition transmission in a search space where a time domain transmission happens earlier preferentially.

In another implementation, each of the search spaces for repetition transmissions has repetition transmission number identifiers which are based on a chronological order of the repetition transmissions and are increased in order; the preset transmission rule includes: in an ascending order of repetition transmission number identifiers, performing a repetition transmission in a search space with a smaller repetition transmission number identifier preferentially.

In another implementation, the preset transmission rule further includes: with respect to search spaces with a same repetition transmission number identifier and corresponding to different search space indexes, in an ascending order of the search space indexes, performing a repetition transmission in a search space with a smaller search space index preferentially.

In another implementation, the preset transmission rule includes: in a temporal order of time domain transmissions, performing a repetition transmission in a search space where a time domain transmission happens earlier preferentially.

In another implementation, the physical downlink control channel transmission limit includes a maximum number of times of blind detections of the physical downlink control channel or a maximum number of non-overlapped control channel elements.

In another implementation, the method further includes:
not providing supplemental repetition transmissions in a dropped search space; or providing supplemental repetition transmissions in the dropped search space until a number of times of repetition transmissions of the search space meets a configured number of times of repetition transmissions.

According to a third aspect of embodiments of the present disclosure, there is provided a communication processing device, applied to a terminal, the device including:
a detection unit configured to, in response to that a plurality of search spaces for repetition transmissions are configured in a same transmission time unit, perform detections on the search spaces for repetition transmissions according to a preset detection rule; and a dropping unit configured to, in response to that cumulative search spaces where the detection is performed exceed a physical downlink control channel detection limit, drop a current search space where the detection is currently performed and a search space where the detection is not performed.

In an implementation, the preset detection rule includes: in an ascending order of search space indexes, performing a detection in a search space for repetition transmissions with a smaller search space index preferentially.

In another implementation, the preset detection rule further includes: with respect to search spaces for different repetition transmissions with a same search space index, in a temporal order of time domain transmissions, performing a detection in a search space where a time domain transmission happens earlier preferentially.

In another implementation, each of the search spaces for repetition transmissions has repetition transmission number identifiers which are based on a chronological order of the repetition transmissions and are increased in order; the preset detection rule includes: in an ascending order of repetition transmission number identifiers, performing a detection in a search space for a repetition transmission with a smaller repetition transmission number identifier preferentially.

In another implementation, the preset detection rule further includes: with respect to search spaces with a same repetition transmission number identifier and corresponding to different search space indexes, in an ascending order of the search space indexes, performing a detection in a search space with a smaller search space index preferentially.

In another implementation, the preset detection rule includes: in a temporal order of time domain transmissions, performing a detection in a search space where a time domain transmission happens earlier preferentially.

In another implementation, the physical downlink control channel detection limit includes a maximum number of times of blind detections of the physical downlink control channel or a maximum number of non-overlapped control channel elements.

In another implementation, the detection unit is further configured to:

stop monitoring of the dropped search space; or continue to monitor a search space where a network device provides supplemental repetition transmissions until a number of times of repetition transmissions of the search space meets a configured number of times of repetition transmissions.

According to a fourth aspect of embodiments of the present disclosure, there is provided a communication processing device, applied to a network device, the communication processing device including:

a transmission unit configured to, in response to that a plurality of search spaces for repetition transmissions are needed in a same transmission time unit, perform repetition transmissions in the search spaces according to a preset transmission rule; and a dropping unit configured to, in response to that cumulative search spaces where repetition transmissions are performed exceed a physical downlink control channel transmission limit, drop a current search space where a repetition transmission is currently performed and a search space where a repetition transmission is not performed.

In an implementation, the preset transmission rule includes: in ascending order of search space indexes, performing repetition transmissions in a search space with a smaller search space index preferentially.

In another implementation, the preset transmission rule further includes: with respect to search spaces for different repetition transmissions with a same search space index, in a temporal order of time domain transmissions, performing a repetition transmission in a search space where a time domain transmission happens earlier preferentially.

In another implementation, each of the search spaces for repetition transmissions has repetition transmission number identifiers which are based on a chronological order of the repetition transmissions and are increased in order; the preset transmission rule includes: in an ascending order of repetition transmission number identifiers, performing a repetition transmission in a search space with a smaller repetition transmission number identifier preferentially.

In another implementation, the preset transmission rule further includes: with respect to search spaces with a same repetition transmission number identifier and corresponding to different search space indexes, in an ascending order of the search space indexes, performing repetition transmissions in a search space with a smaller search space index preferentially.

In another implementation, the preset transmission rule includes: in a temporal order of time domain transmissions, performing a repetition transmission in a search space where a time domain transmission happens earlier preferentially.

In another implementation, the physical downlink control channel transmission limit includes a maximum number of times of blind detections of the physical downlink control channel or a maximum number of non-overlapped control channel elements.

In another implementation, the transmission unit is further configured to:

not provide supplemental repetition transmissions in a dropped search space; or provide supplemental repetition transmissions in the dropped search space until a number of times of repetition transmissions of the search space meets a configured number of times of repetition transmissions.

According to a fifth aspect of embodiments of the present disclosure, there is provided a communication processing device, including:

a processor; and a memory storing instructions executable by the processor;

wherein the processor is configured to perform the communication processing method according to the first aspect or any implementation of the first aspect.

According to a sixth aspect of embodiments of the present disclosure, there is provided a communication processing device, including:

a processor; and a memory storing instructions executable by the processor;

wherein the processor is configured to perform the communication processing method according to the second aspect or any implementation of the second aspect.

According to a seventh aspect of embodiments of the present disclosure, there is provided a non-transitory computer readable storage medium, wherein when instructions in the storage medium are executed by a processor of a mobile terminal, the mobile terminal is caused to perform the communication processing method according to the first aspect or any implementation of the first aspect.

According to an eighth aspect of embodiments of the present disclosure, there is provided a non-transitory computer readable storage medium, wherein when instructions in the storage medium are executed by a processor of a network device, the network device is caused to perform the communication processing method according to the second aspect or any implementation or the second aspect.

The technical solutions provided by embodiments of the present disclosure may include the following beneficial effects. When a plurality of search spaces for repetition transmissions are configured in the same transmission time unit, a preset detection rule is determined based on search space indexes and/or the search spaces for repetition transmissions, and detection is performed in the search spaces for repetition transmissions based on the determined preset detection rule. In response to that cumulative search spaces where the detection is performed exceed a physical downlink control channel detection limit, a current search space where the detection is currently performed and a search space where the detection is not performed are dropped. In this way, the transmission efficiency in the search spaces can be optimized.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication processing method, the method comprising:
in response to determining that a plurality of search spaces for repetition transmissions are configured in a same transmission time unit, performing, by a terminal, detections in the search spaces for repetition transmissions according to a preset detection rule; and
in response to determining that cumulative search spaces where the detections are performed exceed a physical downlink control channel detection limit, dropping, by the terminal, a current search space where a detection is currently performed and a search space where a detection is not performed,
wherein in response to that cumulative search spaces where the detections are performed exceed the physical downlink control channel detection limit, dropping the current search space where the detection is currently performed and the search space where the detection is not performed, comprises:
in response to that the physical downlink control channel detection limit is not exceeded when a part of repetition transmissions in the current search space where the detection is currently performed is cumulatively counted, but the physical downlink control channel detection limit is exceeded when a current repetition transmission in the current search space is cumulatively counted, dropping the current repetition transmission in the current search space, a non-detected repetition transmission in the current search space, and the search space where the detection is not performed.

2. The communication processing method according to claim 1, wherein the preset detection rule comprises: in an ascending order of search space indexes, performing a detection in a search space with a smaller search space index preferentially.

3. The communication processing method according to claim 1, wherein the preset detection rule further comprises: with respect to search spaces for different repetition transmissions with a same search space index, in a temporal order of time domain transmissions, performing a detection in a search space where a time domain transmission happens earlier preferentially.

4. The communication processing method according to claim 1, wherein each of the search spaces for repetition transmissions has repetition transmission number identifiers which are based on a chronological order of the repetition transmissions and are increased in order;
wherein the preset detection rule comprises: in an ascending order of repetition transmission number identifiers, performing a detection in a search space corresponding to a repetition transmission with a smaller repetition transmission number identifier preferentially.

5. The communication processing method according to claim 4, wherein the preset detection rule further comprises: with respect to search spaces with a same repetition transmission number identifier and corresponding to different search space indexes, in an ascending order of the search space indexes, performing a detection in a search space with a smaller search space index preferentially.

6. The communication processing method according to claim 1, wherein the preset detection rule comprises: in a temporal order of time domain transmissions, performing a detection in a search space where a time domain transmission happens earlier preferentially.

7. The communication processing method according to claim 1, wherein the physical downlink control channel detection limit comprises a maximum number of times of blind detections of the physical downlink control channel or a maximum number of non-overlapped control channel elements.

8. The communication processing method according to claim 1, further comprising:
stopping monitoring of the dropped search space; or
continuing to monitor a search space where a network device provides supplemental repetition transmissions until a number of times of repetition transmissions of the search space meets a configured number of times of repetition transmissions.

9. A communication processing method, applied to a network device, the method comprising:
in response to determining that a plurality of search spaces for repetition transmissions are needed in a same transmission time unit, performing repetition transmissions in the search spaces according to a preset transmission rule; and
in response to determining that cumulative search spaces where repetition transmissions are performed exceed a physical downlink control channel transmission limit, dropping a current search space where a repetition transmission is currently performed and a search space where a repetition transmission is not performed,
wherein in response to that cumulative search spaces where repetition transmissions are performed exceed the physical downlink control channel transmission limit, dropping the current search space where the repetition transmission is currently performed and the search space where a repetition transmission is not performed, comprises:
in response to that the physical downlink control channel detection limit is not exceeded when a part of repetition transmissions in the current search space where the repetition transmission is currently performed is cumulatively counted, but the physical downlink control channel detection limit is exceeded when a current repetition transmission in the current search space is cumulatively counted, dropping the current repetition transmission in the current search space, a non-transmitted repetition transmission in the current search space, and the search space where the repetition transmission is not performed.

10. The communication processing method according to claim 9, wherein the preset transmission rule comprises: in an ascending order of search space indexes, performing a repetition transmission in a search space with a smaller search space index preferentially.

11. The communication processing method according to claim 9, wherein the preset transmission rule further comprises: with respect to search spaces for different repetition transmissions with a same search space index, in a temporal order of time domain transmissions, performing a repetition transmission in a search space where a time domain transmission happens earlier preferentially.

12. The communication processing method according to claim 9, wherein each of the search spaces for repetition transmissions has repetition transmission number identifiers which are based on a chronological order of the repetition transmissions and are increased in order;

wherein the preset transmission rule comprises: in an ascending order of repetition transmission number identifiers, performing a repetition transmission in a search space with a smaller repetition transmission number identifier preferentially.

13. The communication processing method according to claim 12, wherein the preset transmission rule further comprises: with respect to search spaces with a same repetition transmission number identifier and corresponding to different search space indexes, in an ascending order of the search space indexes, performing a repetition transmission in a search space with a smaller search space index preferentially.

14. The communication processing method according to claim 9, wherein the preset transmission rule comprises: in a temporal order of time domain transmissions, performing a repetition transmission in a search space where a time domain transmission happens earlier preferentially.

15. The communication processing method according to claim 9, wherein the physical downlink control channel transmission limit comprises a maximum number of times of blind detections of the physical downlink control channel or a maximum number of non-overlapped control channel elements.

16. The communication processing method according to claim 9, further comprising:

not providing supplemental repetition transmissions in a dropped search space; or providing supplemental repetition transmissions in the dropped search space until a number of times of repetition transmissions of the search space meets a configured number of times of repetition transmissions.

17. A communication processing device, comprising:

a processor; and a memory storing instructions executable by the processor;

wherein the processor is configured to:

in response to determining that a plurality of search spaces for repetition transmissions are configured in a same transmission time unit, perform detections in the search spaces for repetition transmissions according to a preset detection rule; and in response to determining that cumulative search spaces where the detections are performed exceed a physical downlink control channel detection limit, drop a current search space where a detection is currently performed and a search space where a detection is not performed:

wherein the processor is configured to:

in response to that the physical downlink control channel detection limit is not exceeded when a part of repetition transmissions in the current search space where the detection is currently performed is cumulatively counted, but the physical downlink control channel detection limit is exceeded when a current repetition transmission in the current search space is cumulatively counted, drop the current repetition transmission in the current search space, a non-detected repetition transmission in the current search space, and the search space where the detection is not performed.

18. The terminal device according to claim 17, wherein the preset detection rule comprises: in an ascending order of search space indexes, performing a detection in a search space with a smaller search space index preferentially.

19. The terminal device according to claim 17, wherein the preset detection rule further comprises: with respect to search spaces for different repetition transmissions with a same search space index, in a temporal order of time domain transmissions, performing a detection in a search space where a time domain transmission happens earlier preferentially.

20. The terminal device according to claim 17, wherein each of the search spaces for repetition transmissions has repetition transmission number identifiers which are based on a chronological order of the repetition transmissions and are increased in order;

wherein the preset detection rule comprises: in an ascending order of repetition transmission number identifiers, performing a detection in a search space corresponding to a repetition transmission with a smaller repetition transmission number identifier preferentially.

* * * * *